United States Patent
Yu et al.

(10) Patent No.: US 7,862,632 B2
(45) Date of Patent: Jan. 4, 2011

(54) MULTI-BURNER GASIFICATION REACTOR FOR GASIFICATION OF SLURRY OR PULVERIZED HYDROCARBON FEED MATERIALS AND INDUSTRY APPLICATIONS THEREOF

(75) Inventors: Zunhong Yu, Shanghai (CN); Guangsuo Yu, Shanghai (CN); Xin Gong, Shanghai (CN); Fuchen Wang, Shanghai (CN); Haifeng Liu, Shanghai (CN); Zhenghua Dai, Shanghai (CN); Yifei Wang, Shanghai (CN); Weifeng Li, Shanghai (CN); Qinfeng Liang, Shanghai (CN); Xiaolei Guo, Shanghai (CN); Xingjun Wang, Shanghai (CN); Xueli Chen, Shanghai (CN); Zhijie Zhou, Shanghai (CN)

(73) Assignee: East China University of Science & Technology

( * ) Notice: Subject to any disclaimer, the term of this patent is extended or adjusted under 35 U.S.C. 154(b) by 868 days.

(21) Appl. No.: 11/748,844

(22) Filed: May 15, 2007

(65) Prior Publication Data
US 2008/0134578 A1 Jun. 12, 2008

(30) Foreign Application Priority Data
Dec. 12, 2006 (CN) .................... 2006 1 0119511

(51) Int. Cl.
*B01J 7/00* (2006.01)
*H01M 8/06* (2006.01)
*C10J 3/68* (2006.01)
*C10J 3/46* (2006.01)
*C10J 3/54* (2006.01)
*C01B 3/36* (2006.01)
*C01B 6/24* (2006.01)
*C01B 3/02* (2006.01)
*C01B 3/24* (2006.01)

(52) U.S. Cl. .................... 48/61; 48/77; 48/197 R; 423/644; 423/648.1; 423/650

(58) Field of Classification Search .................... 48/61, 48/197 R; 423/644, 648.1, 650
See application file for complete search history.

(56) References Cited

U.S. PATENT DOCUMENTS
2,871,114 A 1/1959 DuBois Eastman

FOREIGN PATENT DOCUMENTS
CN 86103455 A 11/1986
(Continued)

OTHER PUBLICATIONS
F.P. Rico and D.B. Spalding, Measurements of Entrainment by Axisymmetrical Turbulent Jets, Journal of Fluid Mechanics, 1961, vol. 11, pp. 21-32, Imperial college of Science and Technology, London, England.

*Primary Examiner*—Alexa D Neckel
*Assistant Examiner*—Matthew J Merkling
(74) *Attorney, Agent, or Firm*—Blank Rome LLP

(57) ABSTRACT

Disclosed is a multi-burner gasification reactor for gasification of slurry or pulverized hydrocarbon feed materials and industry applications thereof. Burners are disposed on the periphery or top of a gasification reactor vessel, wherein the side burners are at a small downward angle relative to the horizontal plane, which can prolong the life of refractory bricks. The operating pressure of the gasification reactor is 0.1~12 MPa, and the operating temperature thereof is 1350° C.~1700° C. The gasification reactor is applicable to a hot-wall lining as well as a cold-wall lining. The notable advantages of the gasification reactor are carbon conversion is high and can reach 99%, and the effective gas content is high; specific coal consumption and specific oxygen consumption are low; and it is applicable to a large coal gasification plant that processes above 3000 tons of coal per day.

10 Claims, 4 Drawing Sheets

U.S. PATENT DOCUMENTS

| | | |
|---|---|---|
| 4,110,359 A | 8/1978 | Marion |
| 4,197,281 A | 4/1980 | Muenger et al. |
| 4,228,604 A | 10/1980 | Cherian |
| 4,251,228 A | 2/1981 | Muenger et al. |
| 4,527,997 A | 7/1985 | Espedal |
| 4,637,823 A | 1/1987 | Dach |
| 4,710,202 A | 12/1987 | Gohler et al. |
| 4,799,356 A | 1/1989 | Doering |
| 4,889,540 A | 12/1989 | Segerstrom et al. |
| 4,919,688 A | 4/1990 | Suggitt et al. |
| 5,281,243 A | 1/1994 | Leininger |
| 5,554,202 A * | 9/1996 | Brooker et al. .............. 48/62 R |
| 2002/0095866 A1 | 7/2002 | Hassett |
| 2004/0261316 A1 * | 12/2004 | Weaver ........................ 48/210 |
| 2008/0047198 A1 | 2/2008 | Mehlhose et al. |
| 2008/0141588 A1 | 6/2008 | Kirchhubel et al. |
| 2008/0172941 A1 | 7/2008 | Jancker et al. |

FOREIGN PATENT DOCUMENTS

| | | |
|---|---|---|
| CN | 86103456 A | 11/1986 |
| CN | 88102581 A | 11/1988 |
| CN | ZL 98110616.1 | 11/1988 |
| CN | ZL90103807.5 | 7/1994 |
| CN | ZL 95111750.5 | 7/2000 |
| CN | ZL94193847.6 | 6/2001 |
| CN | ZL 200420114032.6 | 2/2006 |
| CN | ZL 200410067212.8 | 10/2006 |
| CN | 200610116588.2 | 3/2007 |
| DE | 3714915 A1 | 11/1988 |
| EP | 0290087 A2 | 11/1988 |
| JP | 59176391 A * | 10/1984 |
| JP | 60065094 A * | 4/1985 |

OTHER PUBLICATIONS

Applied Science Publishers Ltd, Combustion in Turbulent Jet Diffusion Flames, Combustion Aerodynamics, 1972, pp. 40-41, Galliard Limited, Essex, England.

R. Gunther and B. Lenze, Length of Diffusion Jet Flames, International Journal on Gas Utilisation, 1966, pp. 376-381, Gasswarme, vol. 15, Vulkan-Verlag Dr. W. Classen, Essen.

* cited by examiner

MULTI-BURNER GASIFICATION REACTOR FOR GASIFICATION OF SLURRY OR PULVERIZED HYDROCARBON FEED MATERIALS AND INDUSTRY APPLICATIONS THEREOF

This application claims priority to Chinese Patent Application No. 200610119511.0 filed on Dec. 12, 2006 the contents whereof are hereby incorporated.

FIELD OF THE INVENTION

This invention relates to gasification equipment of hydrocarbon materials, and, more specifically to a multi-burner gasification reactor fed with slurry or pulverized hydrocarbon materials.

BACKGROUND OF THE INVENTION

With the development of human society, the bottleneck of energy and environment protection appears gradually, for which people have spent painstaking effort so that energy-related equipment has been increasingly perfected. Gasification reactors have also been developed from original fixed-beds (1920s) and fluidized-beds (1930s) to recent entrained-beds. The typical entrained-bed gasification technologies are GE gasification (former Texaco gasification, U.S. Pat. Nos. 4,637,823, 4,527,997, 5,281,243) and Shell gasification (U.S. Pat. No. 4,799,356). The former is fed with slurry state materials and the latter is fed with pulverized state materials. Some drawbacks of current gasification technologies have appeared in practical applications. For example, GE gasification drawbacks include low carbon conversion (only 94~95%), low effective gas content (78~81% of ($CO+H_2$) when fed with coal-water slurry), limited life of refractory bricks near a syngas and slag outlet (only 2000~3000 hours). The above drawbacks are mainly caused by unreasonable setting of gasification burners. The gasification burner is set at the center line of the top of the gasification reactor vessel, so the residence time distribution of the materials in the reactor is relatively wide, ranging from the shortest 0.01 s to the longest 32 s. The flow field and velocity distribution of GE gasification reactor are shown in FIG. 1, in which the flow field can be divided into three regions: jet-flow region (I), recirculation-flow region (II) and plug-flow region (III). The materials with short residence time are discharged from the gasification chamber before completion of chemical reactions, which is the ultimate reason for low carbon conversion. Shell gasification drawbacks are: the syngas from the gasification reactor is cooled by recycled clean syngas, and the ratio of the recycled clean syngas to the syngas from the gasification reactor is 0.8; with the same treatment capacity, investment of Shell gasification is more than two times that of the GE gasification; and the gasification reactor is very complex. Shell gasification adopts multiple burners too, but the setting of the burners is not reasonable, which results in large amount of dusts being carried out of the gasification reactor. To increase carbon conversion, Shell gasification adopts return dusts and the setting of burners is also very complex, including startup burner, gasification burner, etc. Even now, different kinds of problems often occur in the Shell gasification plants such as Shuanghuan (Hubei Province) and Anqing (Anhui Province) in China. In view of the above, it is highly desirable in the art that a gasification reactor with better performance be invented.

The object of this invention is to disclose a multi-burner gasification reactor for gasification of slurry or pulverized hydrocarbon feed materials and industry applications thereof, which can eliminate the above drawbacks.

SUMMARY OF THE INVENTION

The conception of this invention is as follow:

On the basis of over 20 years of research in the gasification field, the inventors bring forward the conception of a multi-burner gasification reactor, which has the following main features:

(1) For the gasification reactions of hydrocarbon materials under high temperature and pressure, the controlled processes are diffusion and mixing which should be reinforced;

(2) To narrow the distribution of residence time of materials in the gasification reactor (namely, to achieve more reasonable distribution) to increase carbon conversion, appropriate flow field and velocity distribution are necessary, shown in FIG. 2 and FIG. 3, wherein FIG. 3 is an A-A schematic view of FIG. 2. The flow field can be divided into six regions: jet-flow region 101, impinging region 102, impinging-flow region 103, recirculation-flow region 104, reentry-flow region 105 and plug-flow region 106;

(3) To ensure the life of the refractory bricks at the top of the gasification reactor, such as over 8000 hours, impinging flows should have a small downward angle;

(4) To overcome the effect of thermal expansion of the refractory bricks on burner displacement, brick-supporters should be provided. Simultaneously the brick-supporters can play a role in protection of a thermometric element (namely thermocouples);

(5) The syngas and slag outlet of the gasification chamber should be enlarged to make sure that the gasification reactor is applicable to the gasification of high ash content hydrocarbon materials, such as sludge.

Gasification processes take place in the following manner: Slurry or pulverized hydrocarbon materials are injected into the gasification reactor through a special passage, while a gasifying agent (pure oxygen) and steam (only used in pulverized mediums) are injected into the gasification reactor through the special passage too. Oxygen (or together with $H_2O$) is injected with a velocity of 30~200 m/s. Burners are set in pairs and meet at 180 degrees, thus forming an impinging-flow. Since every stream has a slightly downward angle (1~10 degrees), the upward velocity of the impinging-flow is decreased, which can ensure the life of the refractory bricks at the top of the gasification reactor. In the gasification chamber, main chemical reactions among hydrocarbon material, oxygen and steam are listed as follows:

$$C+O_2=CO_2 \tag{1}$$

$$C+H_2O=CO+H_2 \tag{2}$$

$$C+CO_2=CO \tag{3}$$

$$CO+H_2O=CO_2+H_2 \tag{4}$$

$$C+2H_2=CH_4 \tag{5}$$

According to the above conception, this invention discloses a multi-burner gasification reactor for gasification of slurry or pulverized hydrocarbon feed materials. Said multi-burner gasification reactor includes:

an upright cylindrical vessel including a refractory lining layer therein;

a brick-supporting plate, disposed at the middle of the upright vessel, dividing the upright vessel into two parts: an upper gasification chamber and a lower scrubbing and cooling chamber;

n pairs (2≦n≦10) of gasification burner chambers disposed on the periphery of said gasification chamber, each pair of which is symmetrically opposed and meets at 180 degrees, the axis of which is at an angle of 1~10 degrees relative to the horizontal plane, which locate at the horizontal plane where the distance (H) between the gasification burner planes and the top of the reactor vessel is 1~2 times the inner diameter ($D_i$) of the gasification reactor, and which can be set as one, two or three layers, and the gasification burner chamber disposed on the top of said gasification chamber being parallel to the axis of the gasification reactor;

gasification burners disposed in the gasification burner chambers, the gasification burners being coaxial with the gasification burner chambers and being used to introduce the slurry or pulverized hydrocarbon materials into the gasification reactor and to mix them well for gasification reactions;

the refractory lining can be a cold-wall lining, e.g. the technology disclosed in Chinese Pat. No. ZL 200410067212.8, or a hot-wall lining, e.g. the technology disclosed in Chinese Pat. No. ZL 98110616.1;

brick-supporters disposed in the refractory brick lining layer;

a syngas and slag outlet disposed in the center of the supporting-plate, wherein high temperature syngas and melted ash concurrently flow through the syngas and slag outlet, and the high temperature syngas can well carry the flow of the high viscous melted ash;

a water jacket disposed on the back of the brick-supporting plate, wherein cooling water enters from the bottom of the water jacket and overflows from the top;

a syngas and slag tube disposed at the lower of the syngas and slag outlet and inserted in the scrubbing and cooling chamber;

a cooling water ring disposed at the center of the brick-supporting plate and fixed to said brick-supporting plate, wherein water spouting from the cooling water ring chills the high temperature syngas and the melted ash to protect the syngas and slag tube from ablating;

bubble-breaking plates disposed inside the scrubbing and cooling chamber and out of the syngas and slag tube, wherein the bubble-breaking plates are fixed on the inner side of the gasification reactor vessel by a bubble-breaking plate shelf, and there is some gap between the bubble-breaking plates and the syngas and slag tube, the purpose of the bubble-breaking plates being to break big bubbles and enhance contacting effect of liquid and solid;

a syngas outlet disposed at the upper portion of the scrubbing and cooling chamber;

a black water outlet disposed at the lower portion of the scrubbing and cooling chamber;

a slag water outlet disposed at the bottom of the scrubbing and cooling chamber;

a high pressure nitrogen blowing pipe disposed at the lower portion of the scrubbing and cooling chamber and inside the syngas and slag tube to blow high pressure nitrogen at regular intervals to remove possible ash accumulated at the syngas and slag outlet in the center of the brick-supporting plate;

The fire-end profile of the gasification chamber is bell mouth, and the end of the gasification burners is shorter than the refractory lining to prevent the melted ash from blocking the burners after it flows down.

The gasification burners are multi-channel ones, which can adopt multiple burner styles such as internal mixing or external mixing. For example, for slurry hydrocarbon materials, technology disclosed in Chinese Pat. No. ZL 95111750.5 can be used, and for pulverized hydrocarbon materials, technology disclosed in Chinese Pat. No. ZL 200420114032.6 can be used. The objective of this invention also can be achieved with burners of other kinds, such as the cluster-burner shown in Chinese Pat. Application No. 200610116588.2.

The multi-burner gasification reactor in this invention can be used to gasify slurry or pulverized hydrocarbon materials, which can be coal, petroleum coke, biomass, waste and other solid hydrocarbon materials.

The slurry or pulverized hydrocarbon materials (such as coal) with particle diameter smaller than 200 µm are conveyed to the gasification burners, the slurry hydrocarbon materials via a high pressure pump and the pulverized hydrocarbon materials via a carrier gas such as nitrogen or carbon dioxide, respectively. Gasifying agents enter the gasification burner and the mixture of these gasification agents is then injected out of the gasification burner at 30~200 m/s. An impinging stream is formed by the multiple opposed and slightly downwards-inclined gasification burners, which can intensify mixing and diffusion. Then atomized or dispersed hydrocarbon materials are gasified to produce syngas in the gasification chamber. The high temperature syngas, together with melted ash, enters the scrubbing and cooling chamber to remove ash and then syngas enters the downstream syngas treating units through the syngas outlet. Slag is discharged through the slag water outlet and the black water goes to the downstream water treating units through the black water outlet.

The gasification temperature is 1350° C. (hot-wall) ~1700° C. (cold-wall), and the gasification pressure is 0.1~12 Mpa. Carbon conversion of hydrocarbon materials is 99%, and the effective gas (hydrogen and carbon monoxide) content in the syngas outlet is 80~94% (depending on the kind and the state of feed);

For each part of hydrocarbon material by weight, the gasification agent should be 0.4~1.2 parts, and steam 0~0.5 parts;

The gasification agents include oxidant, steam and carbon dioxide;

The oxidant is selected from the group consisting of oxygen, air and the oxygen-enriched air with 60~70% oxygen content;

The weight ratio of the carrier gas (e.g. nitrogen and carbon dioxide) and the hydrocarbon materials is that for each part of the carrier gas, the hydrocarbon materials should be 0.02~0.8 parts;

Compared with the current gasification reactors that have been disclosed, this multi-burner gasification reactor shows the significant advantages that the carbon conversion rate is high and can reach 99%, the effective gas content is high; the specific coal consumption and the specific oxygen consumption are low; the distribution of temperature in gasification reactor is homogeneous, so the ablation of the refractory lining caused by local partial high temperature does not happen and the life of the refractory lining is long; this gasification reactor is applicable to a large gasification plant that processes above 3000 tons of coal per day. The syngas produced, which can be used as the raw materials of chemicals, fuel gas, IGCC power generation, hydrogen, synthetic liquid fuel and DRI etc, has wide applications.

DETAILED DESCRIPTION OF THE EMBODIMENTS

Figure 4:
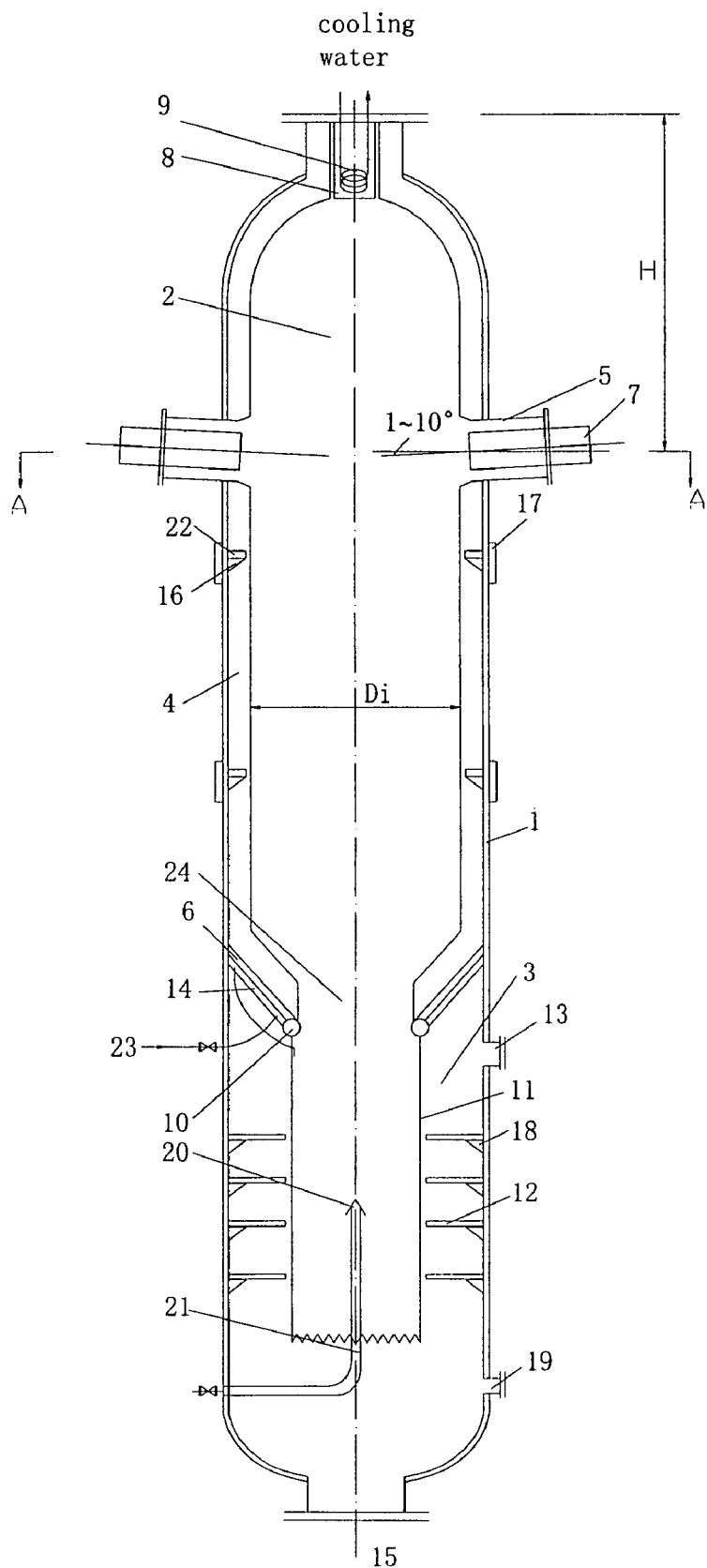
FIG. 4 shows a multi-burner gasification reactor for gasification of slurry or pulverized hydrocarbon feed materials.
Figure 5:
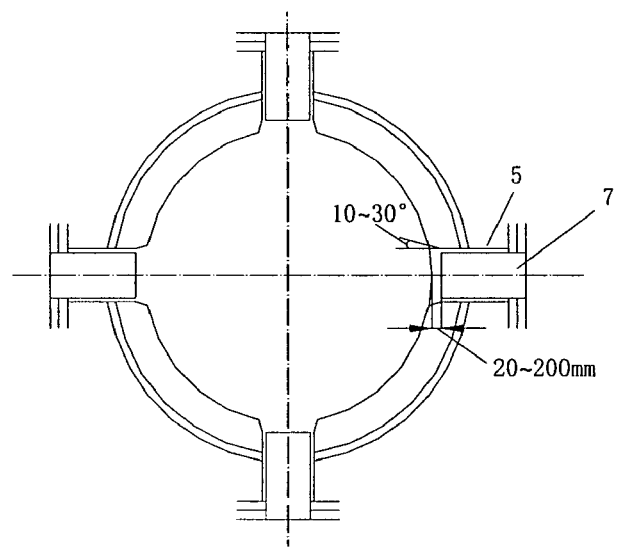
FIG. 5 is a top view of FIG. 4.

Referring to FIG. 4 and FIG. 5, the multi-burner gasification reactor for gasification of slurry or pulverized hydrocarbon feed materials provided by this invention comprises:

an upright cylindrical vessel 1 having a refractory lining therein;

a brick-supporting plate 6, set in the middle of the vertically cylindrical vessel 1, dividing said upright cylindrical vessel 1 into an upper gasification chamber 2 and a lower scrubbing and cooling chamber 3;

n pairs ($2 \leq n \leq 10$) of gasification burner chambers 5 set on the side of said gasification chamber 2, each pair of which is symmetrically opposed and meets at 180 degrees, the axis of which has a 1~10 degrees downward angle relative to the horizontal plane, which locate at the planes whose distance (H) to the top of the reactor vessel is 1~2 times the inner diameter ($D_i$) of the reactor vessel, and which can be set as one, two or three layers. In addition to being set on the periphery of said gasification chamber 2, the gasification burner chamber 5 also can be set at the top of the gasification reactor vessel 1, in which the gasification burner chamber 5 is parallel to the axis of the gasification reactor vessel 1.

The gasification burner 7 set in the gasification burner chamber 5 is coaxial with the gasification burner chamber 5. The gasification burners 7 are used to introduce the slurry or pulverized hydrocarbon materials into gasification chamber 2 and to mix them well, for gasification reactions;

A stoving burner chamber 8 set at the center of the top of the gasification reactor vessel 1, which serves to install a stoving burner to increase temperature of the gasification reactor. When stopping heating, the stoving burner is pulled out and is replaced by a plug cap 9. Said plug cap 9 is a truncated cone cylinder made of refractory materials and includes a cooling coil and steel bars inside;

The refractory lining 4 can be a cold-wall lining or a hot-wall lining;

Brick-supporters are set in the refractory brick lining 4, which is composed of a brick-supporter shelf 16 and a ring round plate 22 set on the brick-supporter shelf 16. The number of the layers of the brick-supporter is 1~4, and the peripheries of said brick-supporter shelf 16 and said ring round plate 22 are lined with refractory fibers.

Strip cooling fins 17 are set outside of the gasification reactor vessel 1 where the brick-supporter shelf 16 is set, each brick-supporter shelf 16 corresponding to one strip cooling fin 17. The strip cooling fin 17 and the brick-supporter shelf 16 are of the same height.

The syngas and slag outlet 24 is set in the center of the brick-supporting plate 6, and the flow area of the syngas and slag outlet 24 is designed based on a medium flow rate of 5-10 m/s. The high temperature syngas and melted ash concurrently flow through the syngas and slag outlet. The high temperature syngas can well carry the flow of the high viscous melted ash.

A water jacket 14 is set on the back of the brick-supporting plate 6. The cooling water enters from a water inlet 23 at the bottom of the water jacket and overflows from the top.

A syngas and slag tube 11 is set at the lower portion of said syngas and slag outlet 24 and inserted into the said scrubbing and cooling chamber 3. The syngas and slag tube 11 is coaxial with the gasification reactor.

A cooling water ring 10 is set at the center of the brick-supporting plate 6 and fixed to said brick-supporting-plate 6. The water spouting from the cooling water ring 10 chills the high temperature syngas and the melted ash to protect the syngas and slag tube 11 from ablating;

Bubble-breaking plates 12 are set in the scrubbing and cooling chamber 3 and at the outer of said syngas and slag tube 11. Said bubble-breaking plates 12 are fixed at the inner side of the gasification reactor vessel 1 through a bubble-breaking plate shelf 18 and keeps a gap from the outer side of the syngas and slag tube 11.

A syngas outlet 13 is set at the upper portion of said syngas scrubbing and cooling chamber 3.

A black water outlet 19 is set at the lower portion of said syngas scrubbing and cooling chamber 3.

A slag water outlet 15 is set at the bottom of said syngas scrubbing and cooling chamber 3.

A high pressure nitrogen blowing pipe 21 is set at the lower portion of the scrubbing and cooling chamber 3 and inside the syngas and slag tube 11, at the head of which there is a high pressure nitrogen nozzle 20 to blow high pressure nitrogen at regular intervals, so as to remove possible ash accumulated at the syngas and slag outlet 24 at the center of the supporting-plate 6.

Referring to FIGS. 4 and 5, the fire-end profile of said gasification burner chamber 5 is bell mouth. The included angle of said bell mouth is 20~60 degrees. The end of the gasification burners 7 is 20~200 mm shorter than that of the refractory lining to prevent the melted ash from blocking the burners after it flows down.

Figure 6:
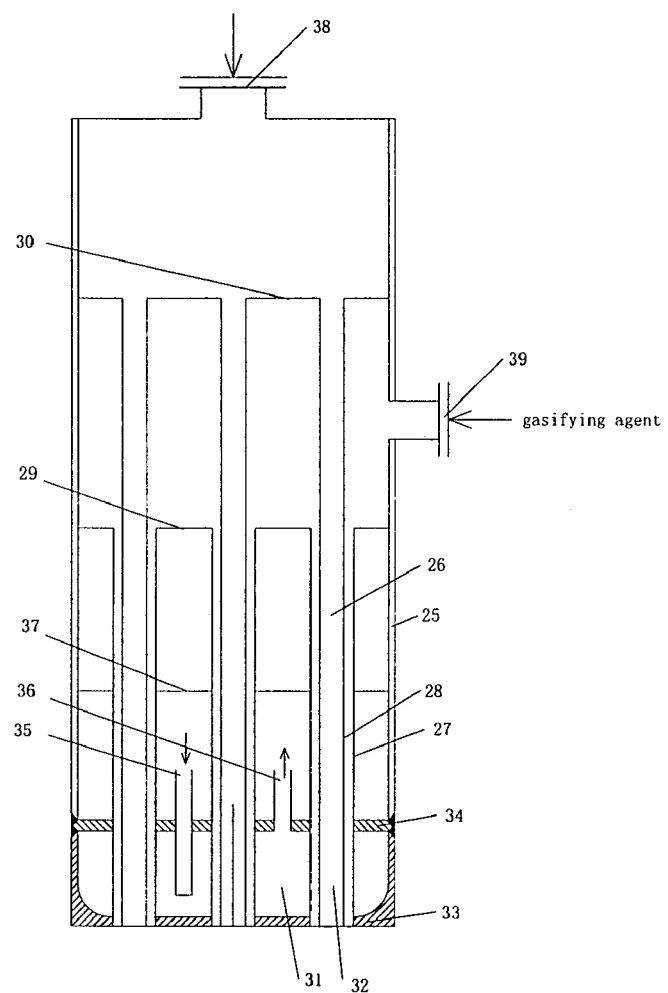
FIG. 6 is a schematic view showing the structure of a cluster-burner.

The gasification burners are multi-channel ones, which can adopt multiple burner styles such as internal mixing or external mixing. For example, for slurry hydrocarbon materials, technology published by Chinese Pat. No. ZL 95111750.5 can be used, and for pulverized hydrocarbon materials, technology published by Chinese Pat. No. ZL 200420114032.6 can be used. The objective of this invention also can be achieved with burners of other styles. The inventors preferably recommend a type of cluster-burner as disclosed in Chinese Pat. Application No. 200610116588.2, the entirety of which is incorporated herewith by reference. As shown in FIG. 6, the cluster-burner comprises a housing 25 and N burners 26 (N>1) within the housing 25, the burners 26 being preferably set vertically in the housing 25 and preferably having their axes parallel with each other.

The burner 26 comprises an outer sleeve 27, an inner sleeve 28 set in the outer sleeve 27, a lower pipe sheet 29, an upper pipe sheet 30 and a cooling chamber 31.

The cooling chamber 31 is set at the outlet 32 of the burner 26. The cooling chamber 31 comprises a U-type encloser 33 which is fixed to the housing 25, a cover plate 34 which is set at the upper of the U-type encloser 33, a cooling water inlet conduit 35 and a water outlet conduit 36 which are both set on the cover plate 34. It is preferable for the inlet conduit 35 to be inserted into the inner bottom surface of the U-type encloser 33, and it is preferable for the outlet conduit 36 to be set near the cover plate 34. The cooing water in the cooling chamber 31 can flow with revolution to improve heat transfer.

A position-setting plate 37 is set in the intermediate section of the housing 25 in order to restrict the vibration of the burner 26 in working.

A coal-slurry or other hydrocarbon materials inlet 38 and a gasification agent inlet 39 are both set at the upper portion of the housing 25. The coal-slurry or other hydrocarbon materials inlet 38 communicates with the inner sleeve 28, and the gasification agent inlet 39 communicates with the outer sleeve 27.

The advantages of the cluster-burner are as follows: Because the flame is relatively short and tends to be rectangular, it is helpful to protect the refractory brick lining at the intermediate or lower portion of the gasification reactor and increase its life. Because the residence time distribution is narrow, it is helpful to increase carbon conversion; Because of the reasonable structure of the cluster-burner, it is helpful to increase the life of the burner.

Example 1

Figure 1:
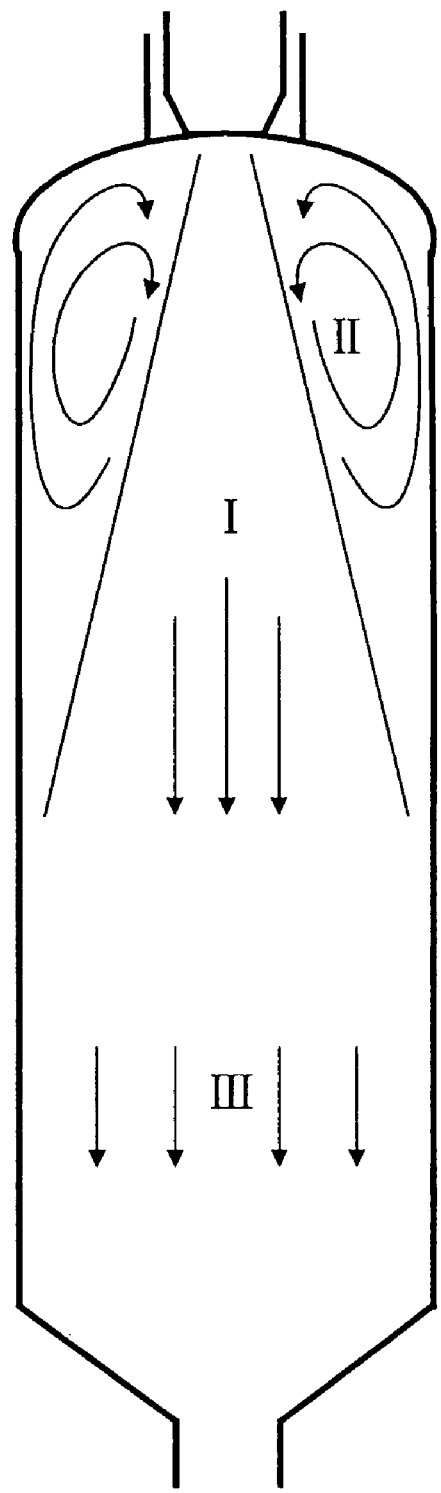
FIG. 1 is a flow field and velocity distribution diagram of a former Texaco gasification reactor.
Figure 2:
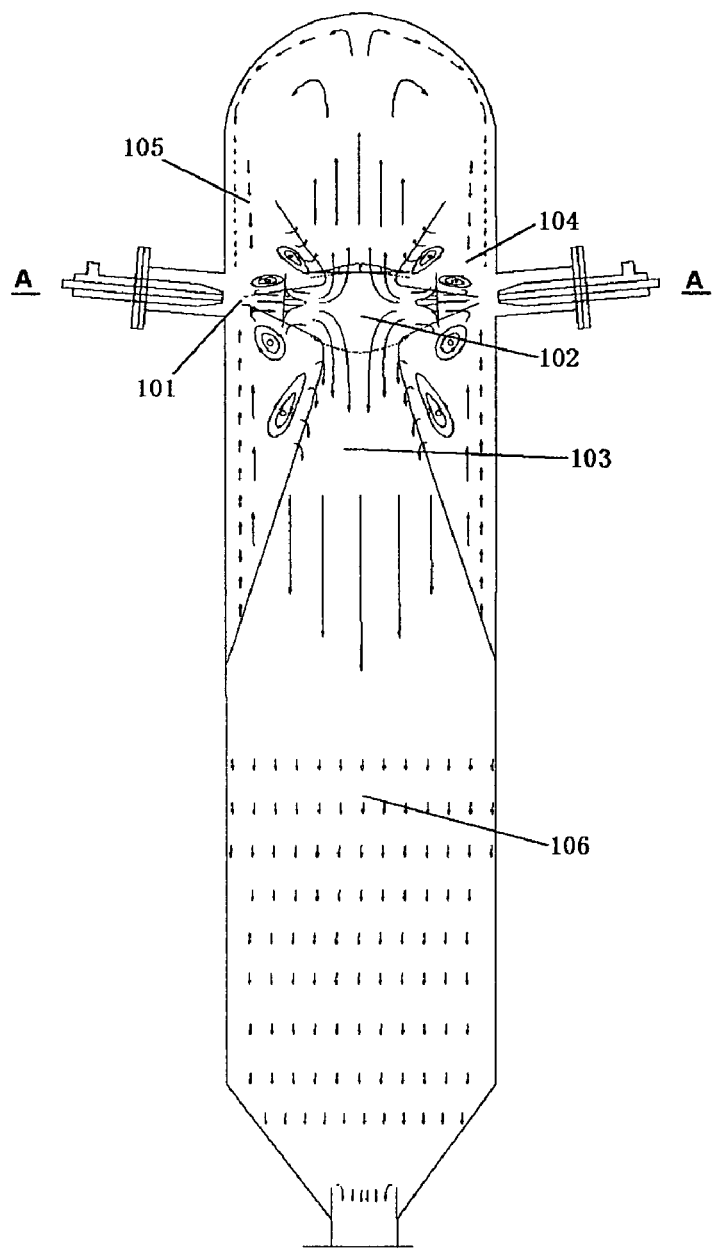
FIG. 2 is a flow field and velocity distribution diagram of the multi-burner gasification reactor of the present invention.
Figure 3:
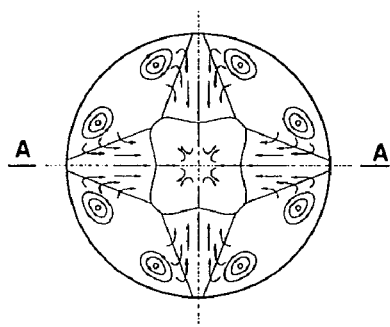
FIG. 3 is a schematic view of FIG. 2 in the A-A direction.

A multi-burner gasification reactor shown in FIG. 1 was used, for which the gasification materials was coal-water slurry, the throughput is 125 t/h coal (3000 t/d coal), the flow rate of coal-water slurry was 210 t/h, the gasification pressure was 6.5 MPa, the hot-wall lining was used, the gasification temperature was 1350° C., the total height of the gasification reactor was 21 m including a gasification chamber with a height of 11 m and a scrubbing and cooling chamber with a height of 10 m, the inner diameter of the gasification chamber vessel was 5.6 m, and 4 layers of bubble-breaking plates were set in the scrubbing and cooling chamber.

Four opposed gasification burner chambers were set symmetrically at the upper portion of the gasification chamber. The distance between the gasification burner chamber and the top of the gasification reactor was 1.5 times the size of the inner diameter of the gasification chamber vessel; the axis of the gasification burner chambers made an angle of 5 degrees with the horizontal plane; the fire-end of the gasification burner chambers 5 was a bell mouth with an included angle of 30 degrees; the fire-end of the gasification burner was 100 mm shorter than that of the refractory lining.

The burner was a type of cluster-burner (Chinese Pat. Application No. 200610116588.2). For cluster-burner, the external diameter of the housing 25 was 260 mm and seven burners 26 were set. The diameter of the inner sleeve was 31–3 mm, and the diameter of the outer sleeve was 39.6×3 mm. The tube pitch of the outer sleeves was 80 mm. The total length of the cluster-burner was 2000 mm. The jet velocity of the coal-water slurry in the inner sleeve was about 4 m/s and about 125 m/s in the outer sleeve.

The coal-water slurry with particle diameter of 30-100 μm at a mass flow rate of 210 t/h and oxygen with 99% oxygen content at a flow rate of 97000 $Nm^3/h$ were divided evenly into 4 shares, and then were introduced into the gasification chamber by four cluster-burners. After the processes of combustion and gasification reactions in the gasification reactor under the operating pressure of 6.5 MPa and the temperature of 1350° C., the hydrogen and carbon monoxide in syngas with a flow rate of 212500 $Nm^3/h$ was produced. The high temperature syngas and melted ash were discharged concurrently out of the gasification chamber through the syngas and slag outlet.

The high temperature syngas, together with melted ash, entered the scrubbing and cooling chamber to remove ash and then syngas entered the downstream syngas treating units through a syngas outlet. Coarse slag was discharged from the gasification reactor to slag discharge equipment, and black water also went to the downstream water treating units through a black water outlet.

The composition of syngas is as follow: 37% $H_2$, 47.5% CO, 14% $CO_2$, 0.6% $N_2$, and a little $H_2S$, Ar, COS, $CH_4$, HCN and $NH_3$. The syngas can be used to produce fertilizer, methanol, hydrogen, liquid fuel, fuel gas, DRI, to generate electricity, etc., or used in advanced IGCC power generation and poly-generation system.

Example 2

The opposed multi-burner gasification reactor shown in FIG. 1 was used, for which the gasification reactor with pulverized coal had a throughput of 100 t/h (2400 t/d) coal, the gasification pressure was 4.0 MPa, the refractory lining of the gasification reactor was water screen, the gasification temperature was 1600° C., the total height of the gasification reactor was 22 meters including a gasification chamber with a height of 12 m and a scrubbing and cooling chamber with a height of 10 m, the inner diameter of the gasification chamber was 2.5 meters, and 4 layers of bubble-breaking plates were set in the scrubbing and cooling chamber.

Four opposed gasification burner chambers were set symmetrically at the upper portion of the gasification chamber. The distance between the gasification burner chamber and the top of the gasification reactor was 1.5 times the size of the inner diameter of the gasification chamber vessel; the axis of the gasification burner chambers made an angle of 4 degrees with the horizontal plane; the fire-end of the gasification burner chambers 5 was a bell mouth with an included angle of 30 degrees; the fire-end of the gasification burner was 100 mm shorter than that of the refractory lining.

The burner described by Chinese Pat. No. 200420114032.6 was chosen as the gasification burner.

The pulverized coal with particle diameter of 30-100 μm at a mass flow rate of 100 t/h coal, pure oxygen with 99% oxygen content at a flow rate of 60000 $Nm^3/h$ and superheated steam with a flow rate of 72 t/h and a temperature of 430° C., were divided evenly into four shares, and introduced into the gasification chamber by four burners. Then combustion reaction and gasification reaction occurred under the operating pressure of 4.0 MPa and the operating temperature of 1600° C. in the gasification chamber. Finally the hydrogen and carbon monoxide in syngas with a flow rate of 190000 $Nm^3/h$ was produced. The high temperature syngas and melted ash were concurrently discharged out of the gasification chamber through the syngas and slag outlet.

The high temperature syngas, together with melted ash, entered the scrubbing and cooling chamber to remove ash and then syngas entered the downstream syngas treating units through a syngas outlet. Coarse slag was discharged from the gasification reactor to slag discharge equipment, and black water also went to the downstream water treating units through a black water outlet.

The composition of syngas is as follow: 31% $H_2$, 59% CO, 4% $CO_2$, 5% $N_2$, and a little $H_2S$, Ar, COS, $CH_4$, HCN and $NH_3$. The syngas was used to produce fertilizer, methanol, hydrogen, liquid fuel, fuel gas, DRI, electricity generation, or advanced IGCC power generation and poly-generation system.

The preferred embodiments of the invention have been described in detail as above. However, it shall be appreciated that, without departing the spirit of the invention, numerous amendments, changes and modifications are possible to a skilled person in the art. Therefore, the scope of the invention is solely intended to be set out in the claims.

We claim:

1. A multi-burner gasification reactor for gasification of slurry or pulverized hydrocarbon feed materials, with an upright cylindrical vessel (1) including a refractory lining layer therein, said reactor further comprising:
   a brick-supporting plate (6), disposed in the middle of the upright cylindrical vessel (1), dividing said upright cylindrical vessel (1) into an upper gasification chamber (2) and a lower scrubbing and cooling chamber (3), n pairs, wherein $2 \leq n \leq 10$, of gasification burner chambers (5) disposed on a periphery of said gasification chamber (2), each pair of said chambers (5) being symmetrically opposed and meeting at 180 degrees, with an axis of each of said chamber (5) being at an angle of 1-10 degrees downward relative to the horizontal plane, located at planes with a distance (H) to the top of the reactor vessel being 1~2 times of an inner diameter ($D_i$) of said vessel (1), and being able to be set as one, two or three layers, a gasification burner (7) disposed in the gasification burner chamber (5), which is coaxial with the gasification burner chamber (5), a fire-end profile of said gasification burner chamber (5) being a bell mouth, and an end of the gasification burners (7) being shorter than that of a refractory lining, strip cooling fins (17) disposed at an outer side of the gasification reactor vessel (1) where a brick-supporter shelf (16) is installed, a syngas and slag outlet (24) disposed in a center of said brick-supporting plate (6), a flow area of which being designed based on a medium flow rate of 5-10 m/s, a water jacket (14) disposed on a back side of said brick-supporting plate (6), a syngas and slag tube (11) disposed at a lower part of said syngas and slag outlet (24) and inserted into said scrubbing and cooling chamber (3), the syngas and slag tube (11) being coaxial with the gasification reactor, a cooling water ring (10) disposed at a center of the brick-supporting plate (6) and fixed to said brick-supporting plate (6), a syngas outlet (13) formed at an upper portion of said syngas scrubbing and cooling chamber (3), a black water outlet (19) formed at a lower portion of said syngas scrubbing and cooling chamber (3), a slag water outlet (15) formed at a bottom of said syngas scrubbing and cooling chamber (3), and a high pressure nitrogen blow pipe (21) set at the lower portion of said syngas scrubbing and cooling chamber (3) and in the syngas and slag tube (11).

2. The multi-burner gasification reactor for gasification of slurry or pulverized hydrocarbon feed materials defined in claim 1, further comprising a stoving burner chamber (8) at a top of the gasification reactor, which has the same axis as the gasification reactor, and in which a stoving burner or a gasification burner (7) can be installed.

3. The multi-burner gasification reactor for gasification of slurry or pulverized hydrocarbon feed materials defined in claim 1, wherein said refractory lining layer (4) can be hot-wall lining or cold-wall lining, said hot-wall lining adopts refractory bricks and said cold-wall lining adopts water screen, and for said hot-wall lining, 1~4 layers of brick-supporters are set.

4. The multi-burner gasification reactor for gasification of slurry or pulverized hydrocarbon feed materials defined in claim 1, wherein said brick-supporter is composed of the brick-supporter shelf (16) and a ring round plate (22) set on the brick-supporter shelf (16), wherein peripheries of said brick-supporter shelf (16) and said ring round plate (22) are lined with a refractory fiber.

5. The multi-burner gasification reactor for gasification of slurry or pulverized hydrocarbon feed materials defined in claim 1, further comprising strip cooling fins (17) when adopting the hot-wall lining, wherein the strip cooling fins (17) are set outside of the gasification reactor vessel (1) where said brick-supporter shelf (16) is installed, each brick-supporter shelf (16) corresponding to one strip cooling fin (17), and a height of said strip cooling fin (17) being 0.5~2 m.

6. The multi-burner gasification reactor for gasification of slurry or pulverized hydrocarbon feed materials defined in claim 1, further comprising bubble-breaking plates (12) disposed in the scrubbing and cooling chamber (3) and outside of said syngas and slag tube (11), wherein said bubble-breaking plates (12) are fixed at an inner side of the gasification reactor vessel (1) through a bubble-breaking plate shelf (18) and keep a gap from an outer side of the syngas and slag tube (11).

7. The multi-burner gasification reactor for gasification of slurry or pulverized hydrocarbon feed materials defined in claim 1, wherein the fire-end profile of said gasification burner chamber (5) is a bell mouth with an included angle of 20~60 degrees, and the end of the gasification burners (7) is 20~200 mm shorter than that of the refractory lining.

8. The multi-burner gasification reactor for gasification of slurry or pulverized hydrocarbon feed materials defined in claim 1, wherein said gasification burner (7) has multiple channels.

9. The multi-burner gasification reactor for gasification of slurry or pulverized hydrocarbon feed materials defined in claim 2, wherein when the stoving burner chamber (8) at the top of the gasification reactor vessel is not used to install the gasification burner (7), the stoving burner is pulled out after finishing stoving and the stoving burner chamber (8) is sealed by a plug cap (9), and said plug cap (9) is a truncated cone cylinder and includes a cooling coil and steel bars therein.

10. The multi-burner gasification reactor for gasification of slurry or pulverized hydrocarbon feed materials defined in claim 8, wherein said gasification burner (7) is a cluster-burner.

\* \* \* \* \*